United States Patent [19] [11] 3,924,723

Cooper et al. [45] Dec. 9, 1975

[54] CENTERING OF TEXTUAL CHARACTER FIELDS ABOUT A POINT

[75] Inventors: Donald Walter Cooper; James Bradley Unruh, both of Austin, Tex.

[73] Assignee: International Business Machines Corporation, Armonk, N.Y.

[22] Filed: Dec. 26, 1973

[21] Appl. No.: 428,542

[52] U.S. Cl. .................... 197/19; 197/34 A; 234/7; 340/172.5

[51] Int. Cl.² ............................................ B41J 5/30

[58] Field of Search ........... 197/19, 20, 84 R, 84 A, 197/91, 187; 199/18; 340/172.5; 234/4–7

[56] References Cited

UNITED STATES PATENTS

| | | | |
|---|---|---|---|
| 1,455,079 | 5/1923 | Cook | 197/91 |
| 2,869,717 | 1/1959 | Rossetto et al. | 199/18 |
| 2,910,163 | 10/1959 | Hanson et al. | 197/19 |
| 3,268,161 | 8/1966 | Sausele et al. | 234/7 |
| 3,272,306 | 9/1966 | De Witt et al. | 197/20 X |
| 3,529,296 | 9/1970 | Friedman et al. | 197/84 AX |
| 3,674,125 | 7/1972 | Kolpek | 197/19 |
| 3,675,216 | 7/1972 | James | 340/172.5 |
| 3,812,945 | 5/1974 | Koplow et al. | 197/19 |
| R25,354 | 3/1963 | Rossetto et al. | 197/19 X |

OTHER PUBLICATIONS

Lincoln et al, "Composing Machine," IBM Tech. Discl. Bull., Vol. 4, No. 12, pp. 67–70 (May 1962).

*Primary Examiner*—Edgar S. Burr
*Assistant Examiner*—R. T. Rader
*Attorney, Agent, or Firm*—Douglas H. Lefeve

[57] ABSTRACT

A system and method are disclosed for providing automatic centering of textual character fields about a chosen horizontal point on a printing line.

A keyboard is electrically connected to a recirculating dynamic shift register memory capable of storing m data codes, each of the codes including n parallel bits. An n bit operation flag code recirculates along with the data codes to define an operating point within the memory. Control circuitry responsive to the keyboard generation of a centering control code enables the input of a center flag code into the memory immediately preceding the operation flag code. Character codes that are subsequently generated by the keyboard are input into the memory immediately preceding the operation flag code, between the center flag code and the operation flag code. Backspace codes corresponding to alternate character codes (2nd, 4th, etc.) are also input into the memory immediately succeeding the center flag code.

A printer connected to the memory backspaces one space for each backspace code as the backspace codes are entered into the memory. Thus, the printer executes a no-print backspace, beginning at the chosen horizontal point, for each 2nd, 4th, 6th, etc., character code entered from the keyboard. When a keyboard generated field-end code (such as a carrier return or tab) is detected, the character codes are printed. The center flag code may be preceded by a tab code corresponding to the desired center point location on the printed record, or the center flag code may be preceeded by spaces or backspaces to position the print carrier to the chosen center point before keying the text. An error-correct feature is also disclosed for deleting the character codes and backspace codes from the memory in the event of an error.

14 Claims, 17 Drawing Figures

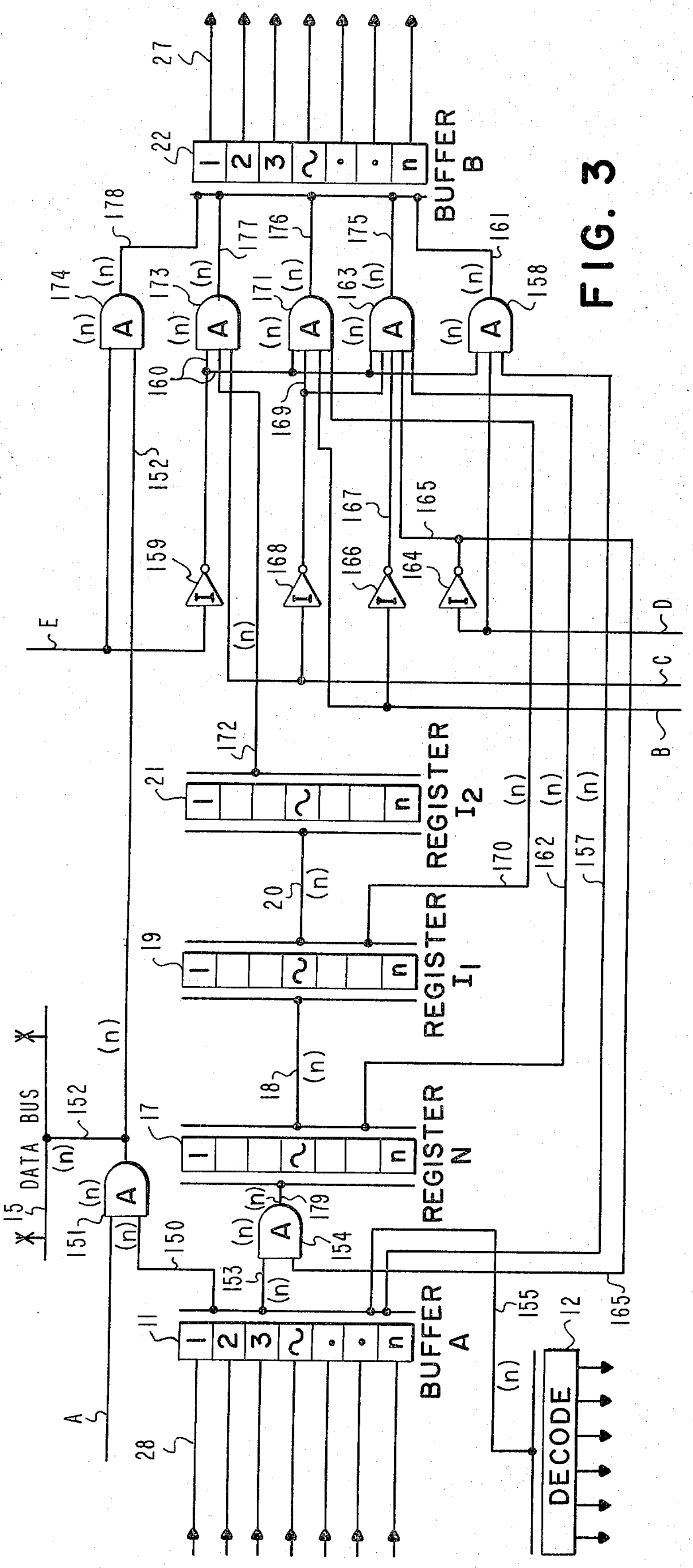
FIG. 3
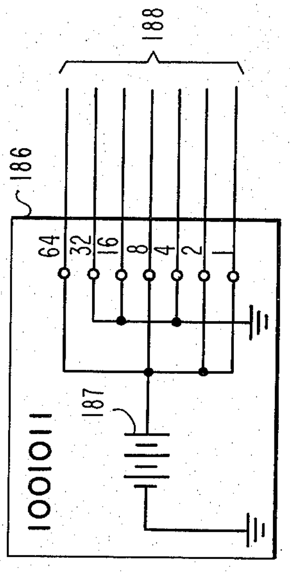
FIG. 6
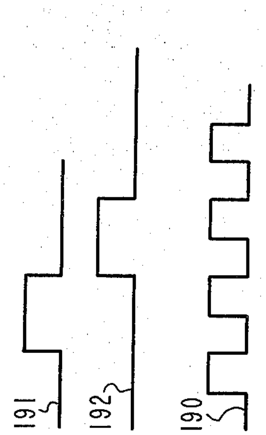
FIG. 5
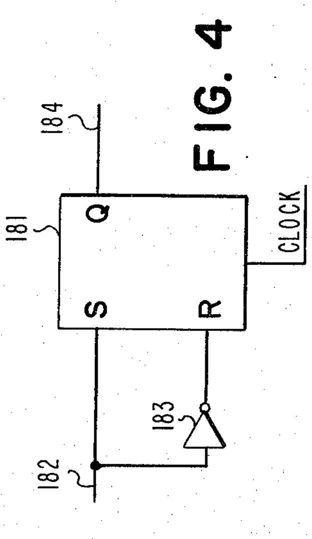

CENTERING OF TEXTUAL CHARACTER FIELDS ABOUT A POINT

CROSS-REFERENCE TO RELATED APPLICATION

U.S. patent application Ser. No. 427,616, filed Dec. 26, 1973 having the same inventors as this invention and entitled, "System for Aligning Textural Character Fields."

BACKGROUND OF THE INVENTION

1. Field of the Invention

This invention relates to text processing in general and more particularly to a system and method for arranging the sequence of textural character codes and control codes upon input of the codes into a recirculating memory to facilitate automatic centering of the printout of the stored textural characters about a chosen point.

2. Description of the Prior Art

A variety of solutions have been offered in the prior art to aid in the preparation of textural material in which it is desired to center groups of textural characters.

U.S. Pat. No. 1,455,079 discloses a manual centering operation wherein the operator, beginning with the carriage at a point to be centered about, strikes a special "speller key" once for each character and space in the text to be centered. The speller key activates the backspace mechanism only on every other speller key depression. After this manual backspacing operation the text is typed normally.

The publication "Text Formatting" appearing in the IBM *Technical Disclosure Bulletin*, Vol. 16, No. 2 pages 391–394 (July 1973) discloses an automatic centering function for use in a power typing system including a character memory. The character memory disclosed by this reference contains a dedicated storage position for each print position along the typewriting line on the typing paper. Entry into the centering mode of operation at the desired center point causes the typewriter to be placed into a non-printing backspace mode. The first character keyed while operating in the centering mode is entered into the memory storage position corresponding to one storage position to the left of the desired center point and the printer is backspaced one space. The second and all succeeding even numbered character or space key depressions produce no backspacing of the printer, and characters are entered immediately to the right of the character or space last entered into the memory. The third and all succeeding odd number key depression produces a backspace of the printer and causes a single shift to the left of all characters and spaces previously entered in the memory, whereupon the character or space is entered into the memory to the right of the previously entered characters or spaces. After all of the text has been keyed, a playout is effected, thereby resulting in the text being centered about the desired point.

The system described above, however, requires a dedicated memory storage position for each character positioned in a typed line or page. Thus, in many applications, such as when extremely wide margins are utilized, a large proportion of the available memory storage positions are not utilized. Therefore, the method of memory formatting or control taught by this publication could not be used in a power typing system utilizing a dynamic shift register memory for the character memory, wherein all storage positions may be utilized for text and control code storage purposes regardless of character line lengths.

For centering a heading, the IBM Magnetic Card "Executive" Typewriter (a variable escapement system) requires tabbing to the desired center point, recording a required backspace code, and keying the text making up the heading. The text codes, tab codes, and backspace codes are recorded on a magnetic card. Upon playout of a subsequent draft, the system recognizes the tab code followed by the required backspace Registered Trademark, International Business Machines Corporation code as a centering operation. Thereafter, the text codes are read from the magnetic card and the printer is backspaced one-half the width of each character as the characters are read. At the end of the text to be centered, the characters are re-read from the card and printed. The suggested operator procedure for centering with this system is to record the tab code, required backspace codes for every two characters in the text to be centered, and then the text to be centered. Thus, the text would be centered if a draft of the codes recorded on the card were printed by a fixed escapement system not recognizing the tab code followed by a required backspace code as a centering operation. Further, the text keyed on the IBM Magnetic Card "Executive" Typewriter would appear to be substantially centered on the first draft as the text is initially keyed. However, when using this suggested operator procedure, the operator must count the characters and spaces in the text and must record required backspace codes for one-half of this count.

Centering operations in composing systems have been proposed wherein the text to be centered is forced to the center by equal length variable space codes occupying the space between the text and a pair of tab codes or the left and right margin. In addition to the relatively high expense of implementation of such a system, a recording of text in this manner could not be printed by another system that did not include the control logic responsive to the variable space codes.

It would, therefore, be advantageous to provide a very efficient system and method for arranging the sequence of storage of textural codes in a recirculating memory, whereby an operator may perform a centering operation about a chosen point on an original draft without counting characters or otherwise causing operator-performed movement of the print element or carriage before typing the text material, other than entry into a centering mode at a chosen point. Registered Trademark, International Business Machines Corporation

SUMMARY OF THE INVENTION

Accordingly, the disclosed system and method provide automatic centering of textural characters about a chosen point. A textural character and control code generating means is electrically connected to a recirculating memory capable of storing m codes, each of the codes including n parallel bits. An n bit operation flag code recirculates along with the other codes to define an operating point within the memory. Control circuitry responsive to the generation of a centering code enables the input of a center flag code into the memory immediately preceding the operation flag code. Character codes that are subsequently generated are input into the memory immediately preceding the operation flag code, between the center flag code and the operation flag code. Backspace codes corresponding to alternate character codes are also input into the memory immediately succeeding the center flag code.

If a printer is connected to the memory the printer backspaces one space for each backspace code as the backspace codes are entered into the memory. The memory organization, therefore, assumes the following format: center flag code; $1/2x$ backspace codes; $x$ character codes; and operation flag code. After a field-end code (such as a carrier return or tab) has been generated and detected, the character codes are printed. The center flag code may be preceded by a tab code corresponding to the desired center point location on the printed record, or the center flag may be preceded by spaces or backspaces to position the carrier to the desired center point before keying the text.

Although the center flag code is replaced by a field-end code in the memory after the first printing of each group of characters, the backspace codes and character codes retained by the memory cause subsequent printings of the character codes stored in the memory to be identical to the first printing.

The disclosed control logic is also responsive to the generation of an error-correct code for deleting the character codes and backspace codes from the memory in the event of an error during the entry of said codes.

The foregoing and other objects, features and advantages of the invention will be apparent from the following more particular description of a preferred embodiment of the invention, as illustrated in the accompanying drawing.

BRIEF DESCRIPTION OF THE DRAWING

FIG. 3 depicts the logical interconnection of the shift register control portion of the dynamic shift register memory.

FIGS. 4 and 5 show a clocked flip-flop and timing diagram therefor, respectively, that may be used as the delay elements shown in FIG. 1.

FIG. 6 shows an implementation of a generator for control codes introduced into the memory by operation of the logical elements of FIGS. 1 and 2.

DETAILED DESCRIPTION OF THE PREFERRED EMBODIMENT

It is assumed, for the purposes of illustration, that logic requiring positive inputs for a positive output is employed unless indicated otherwise. That is, the logic circuits such as AND and OR circuits, for example, are operated by positive signal levels at the input to produce a positive level signal at the output. Logical levels which are not positive will be termed negative.

The term "cable" as used herein denotes a plurality of parallel conductors for conveying one or more coded binary characters in parallel form. It will be understood by those skilled in the art that a cable input to an AND circuit will, in actuality, require an equal plurality of AND circuits, although only one such circuit is shown for illustration purposes herein. The term "line" as used herein denotes a single conductor for the transmission of a positive or negative level logical signal.

Figure 1:
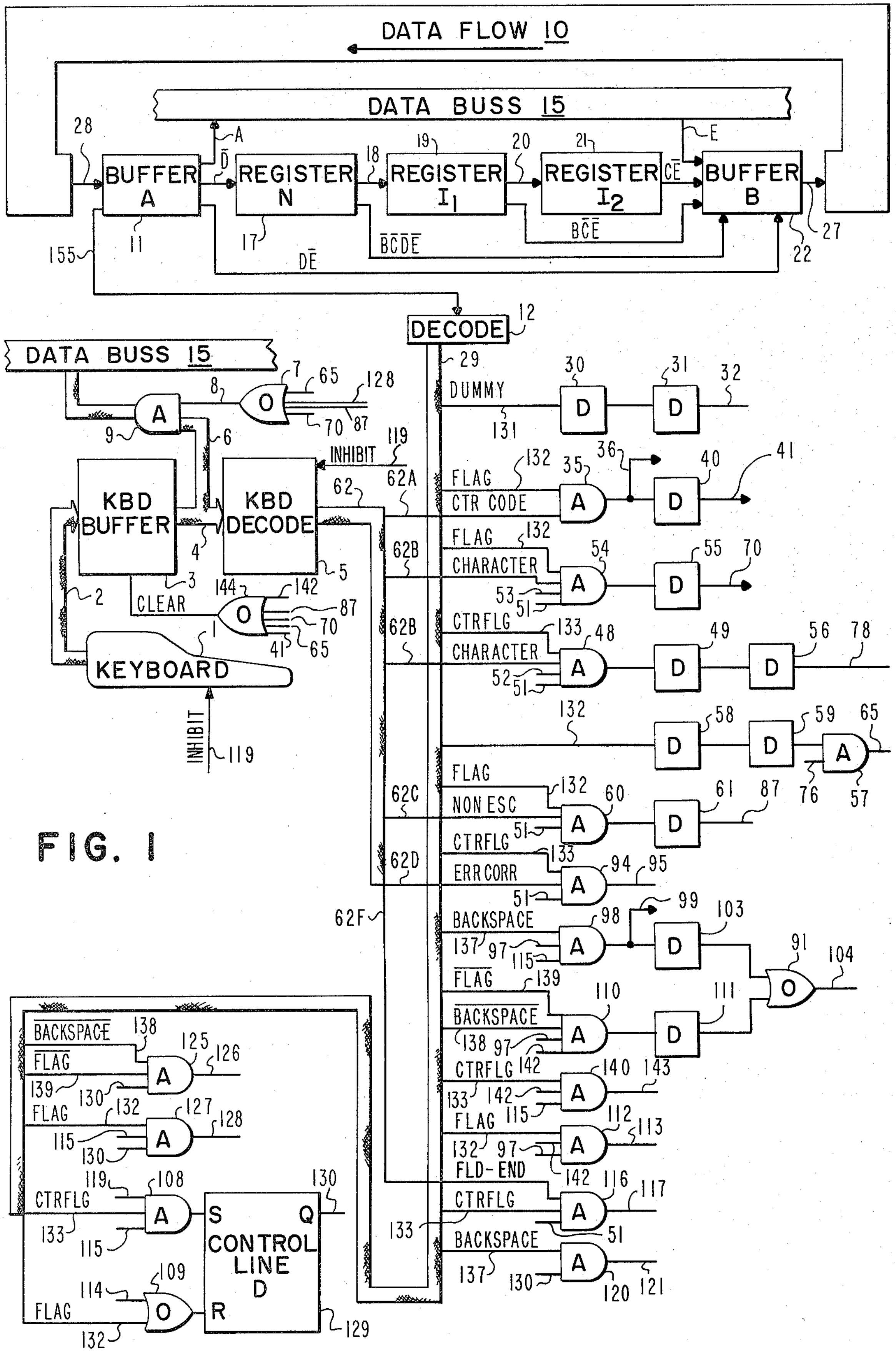
FIGS. 1 and 2 depict a preferred embodiment of the control logic for operation of a keyboard, recirculating buffer, and printer for centering of textual character fields.
Figure 2:
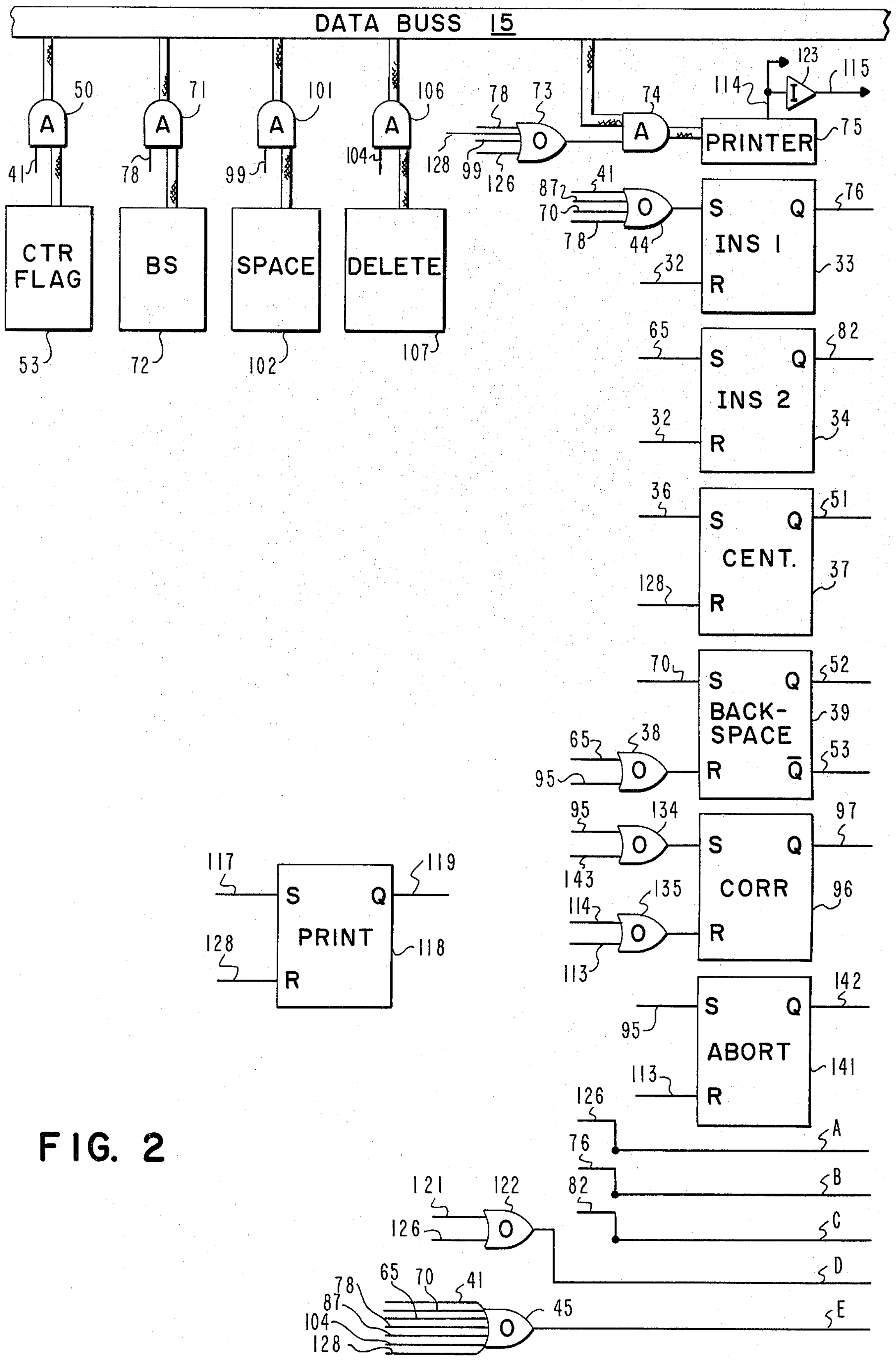

Referring now to FIGS. 1 and 2, an electrical keyboard 1 is provided for operator generation of parallel bit binary charcter codes and control codes. These codes are conveyed along a cable 2 to a keyboard buffer 3, the latter of which may be a one character register for temporary storage of the keyboard-generated codes for utilization by the remainder of the system. Buffer 3 includes a CLEAR input line which is responsive to a positive level to clear the buffer 3 contents at the bit time following application of the positive level, it being assumed that the remainder of the system is unresponsive to the cleared buffer 3 contents. The character and control codes generated by keyboard 1 are gated along cable 6, at appropriate times as explained hereinafter, through AND circuit 9 to data buss 15. From data buss 15 the characters and control codes may be entered into a dynamic shift register memory 10 as explained hereinafter and/or may be gated through AND circuit 74 to printer 75, shown in FIG. 2.

Figure 7:
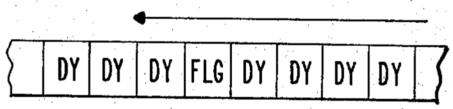
FIGS. 7–17 show pictorial representations of the storage sequence of data and control codes in the memory.
Figure 8:
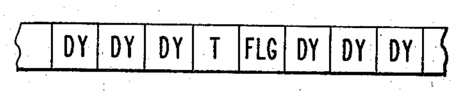
Figure 9:
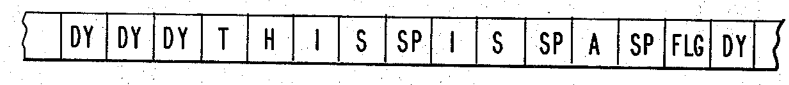

Memory 10 may be of the type described in U.S. Pat. No. 3,675,216 to Randell L. James, Ser. No. 104,888, filed Jan. 8, 1971, issued July 4, 1972, and entitled "No Clock Shift Register and Control Technique." As explained in detail therein, the dynamic shift register memory 10 comprises $m$ character storage positions of $n$ bits in width. The data is continually recirculated throughout the memory 10 in the form of a loop. An $n$ bit operation flag code is initially written into one of the storage locations while $n$ bit dummy codes are written into the remainder of the storage locations, as shown in FIG. 7. Each character or control code to be inserted into the memory 10 is inserted into the memory location that precedes the operation flag and the remainder of character or control codes and dummy codes are shifted to accommodate the insertion. Thus, in FIG. 8 the textural character T has been entered into the memory loop and in FIG. 9 the words and spaces, "THIS IS A," have been entered. In a similar manner, the operation flag code may be used to define the point of output of characters and control codes from the memory 10. Thus, the operation flag defines the operation point within the memory 10 without the necessity for clocking between an input/output device connected to the memory 10 and without a complex addressing system to determine the appropriate memory locations for input or output operations.

Memory 10 includes a shift register control logic network to enable the alteration of data paths as the character, control, and flag codes are circulated through the memory 10 to facilitate input, output, and deletion operations. For discussion purposed hereinafter, the terms "data codes, character codes, and textual codes" will refer to textual character codes and printer control codes, both of which may be output from the memory 10 to a printer 75, as distinguished from flag codes, which are introduced into the memory 10 only by the control logic (not by the keyboard), and which are never output to the printer 75 or other output device. The term "codes" is meant to include both data codes and flag codes. The term "system control code" refers to a keyboard-generated code that causes a particular logical operation of the system, but is not entered into the memory 10.

Referring to FIGS. 1 and 3, data is output from shift register 10 along cable 28 to input buffer 11, a single code register which will also be referred to hereinafter as buffer A. Decode 12 is connected to buffer A by cable 155 and may produce positive signals on one of its output lines depending upon the code then being stored in buffer A. It will be noted in FIG. 3 that all cables and multiple logical elements connected thereto (of which only one such logical element is shown in each instance) are also identified by the notation (n).

In FIG. 3 are shown five lines, A, B, C, D, and E, that are used to control the data paths for the input, output, and passage of data codes and flag codes through the memory 10. In FIG. 1, a shorthand notation of the data paths is shown in Boolean form to depict the paths along which the data and flag codes flow according to the positive and negative levels applied to lines A-E.

In FIG. 3, the application of a positive level on line A enables AND circuit 151 to gate codes from buffer A along cable 150 to cable 152 and then on to data buss 15. This path is denoted by path A in FIG. 1.

As shown in FIG. 1, when a negative level is applied to line D, codes are transferred from buffer A to register 17, a single code register referred to hereinafter as register N. In FIG. 3, the application of a negative level on line D is inverted to a positive level by INVERT 164 and is conveyed along line 165 to enable AND circuit 154 to convey the codes from buffer A along cable 153 to cable 179 and then into register N (17). As shown in both of FIGS. 1 and 3, codes shifted to register N may be also later shifted along cable 18 to insert register 19, a single code register hereinafter referred to as register $I_1$. The codes may then be later shifted from register $I_1$ along cable 20 to insert register 21, a single code register hereinafter referred to as register $I_2$.

Codes may also be transferred from buffer A to output buffer 22, a single code register hereinafter reffered to as buffer B, by providing positive and negative logical levels to lines D and E respectively, in FIG. 1. In FIG. 3, the code in buffer A is conveyed along cable 157 to an input of AND circuit 158. A positive logical level on line D enables a second input of this AND circuit 158 while a negative level on line E is inverted by INVERT circuit 159, to a positive level on line 160 to enable the third input of AND circuit 158 which, thereby allows the gating of codes from cable 157 to cable 161 and into buffer B.

When negative logical levels are applied to lines B, C, D, and E, codes may be shifted out of register N into buffer B as shown in FIG. 1. In FIG. 3, the code in register N (17) is conveyed along cable 162 to one of five inputs of AND circuit 163. A negative logical level on line B is inverted by INVERT circuit 166 to a positive logical level on line 167 to enable a second input of AND circuit 163. A negative logical level on line C is inverted by INVERT circuit 168 to a positive logical level on line 169 to enable a third input of AND circuit 163. A negative logical level on line D is inverted by INVERT circuit 164 to a positive logical level on line 165 to enable a fourth input of AND circuit 163. Finally, a negative logical level on line E is inverted by INVERT circuit 159 to a positive level on line 160 to enable the fifth input of AND circuit 163 thereby gating codes from cable 162 to cable 175 and into buffer B (22).

A code in register $I_1$ may be shifted into buffer B by application of a positive level to line B and negative levels to lines C and E, as shown in FIG. 1. In FIG. 3, the code in register $I_1$ (19) is conveyed along cable 170 to one of four inputs of AND circuit 171. Application of a positive logical level to line B enables a second input of AND circuit 171. Application of a negative logical level to line C is inverted by INVERT circuit 168 to a positive logical level on line 169 to enable a third input of AND circuit 171. Application of a negative level on line E is inverted by INVERT circuit 159 to a positive logical level on line 160 to enable the fourth input of AND circuit 171, thereby allowing codes to be gated from cable 170 to cable 176 and into buffer B (22).

A code in register $I_2$ may be shifted into buffer B by application of a positive level on line C and a negative level on line E, as shown in FIG. 1. In FIG. 3, the code in register $I_2$ (21) is conveyed along cable 172 to an input of AND circuit 173. A positive level on line C enables the second of the three inputs of AND circuit 173. A negative logical level on line E is inverted by INVERT circuit 159 to a positive level on line 160 enabling the third of the three inputs of AND circuit 173 thereby allowing codes to be gated from cable 172 to cable 177 and into buffer B (22).

Codes may be transferred from data buss 15 into output buffer B by application of a positive logical level on line E as shown in FIG. 1. One input of AND circuit 174 (FIG. 3) is connected to cable 152 which is connected to data buss 15. When a positive logical level appears on line E the other input of AND circuit 174 is enabled, thereby allowing codes to be gated from the data buss 15 onto cable 178 and into buffer B (22).

Data shifted into buffer B through any path is conveyed along cable 27 and into memory 10.

The DELAY circuits denoted in FIG. 1 by rectangular boxes including a D may take the form of the circuit shown in FIG. 4, a timing diagram of which is included in FIG. 5. FIG. 4 shows a conventional, clocked S-R flip-flop 181 having an input line 182 connected to the set input thereof. Any signal on line 182 is inverted by INVERT circuit 183 and applied to the reset input of flip-flop 181. The Q output is connected to line 184. A signal having a waveform such as that denoted by reference numeral 190 in FIG. 5 is applied to the CLOCK input of flip-flop 181. When a signal having a waveform denoted by reference numeral 191 is applied to line 182, the Q output of flip-flop 181 becomes positive at the next trailing or falling edge of the clocking waveform 190, thereby providing a signal having a waveform denoted by reference numeral 192. If waveform 191 also becomes negative at this time, the Q output of flip-flop 181 will become negative at the next succeeding falling edge of waveform 190. Thus, flip-flop 181 can be utilized to provide a time delay of one clock cycle.

It will be understood by those skilled in the art that a CLOCK input is required for each of the DELAY circuits used in FIG. 1 if DELAY circuits such as those illustrated in FIG. 4 are utilized. It will also be understood by those skilled in the art that the other flip-flops to be hereinafter discussed as well as the storage cells of memory 10 and the five registers of the shift register control circuitry for memory 10 (buffers A and B and registers N, $I_1$ and $I_2$) may be clocked by waveform 190 or signals derived therefrom. For the purposes of description hereinafter, one clock period will be referred to as a "bit time."

In FIG. 2, code generators 53, 72, 102 and 107 each produce a fixed n bit code for input into the memory 10 and, in some instances, for simultaneous output to the printer 75. FIG. 6 shows a circuit that may be used, for example, to produce a 7 bit binary code. Code generator 186 includes a battery 187 or other suitable voltage source to energize certain order bit positions on output line 188 with a positive level. The other of the 7 bit positions on output line 188 are grounded. It will be understood by those skilled in the art that the circuit of FIG. 6 may be utilized for the abovementioned code generators 53, 72, 102 and 107 or that other code generation means known in the art may be utilized, for example a single character register loaded with the appropriate coded bit pattern.

In the following description of system structure and method of operation it must be assumed, at each bit time, that codes are shifted in the shift register control circuitry along the path determined by the logical levels on lines A through E immediately preceding the beginning of the bit time.

Referring again to FIGS. 1 and 2, a cable 4 connects the keyboard buffer 3 to a keyboard decode unit 5 which appropriately provides positive or logical level output signals along various output lines thereof of line bundle 62, dependent upon the data code then being stored in buffer 3. Line bundle 29 includes the output lines from the memory decode 12.

The detection of a dummy code in buffer A produces a positive level on line 131. At the beginning of the next succeeding bit time the output of delay circuit 30 becomes positive, thereby providing a positive input to DELAY circuit 31. Output of line 32 of DELAY circuit 31 becomes positive at the beginning of the second succeeding bit time and the positive signal thereon is utilized to reset INS1 flii-flop 53 and INS2 flip-flop 34.

Assume now that an operator has depressed the particular key on keyboard 1 to cause the generation of a centering code for entry into the centering code of operation to provide text centering about a chosen point. The decoding of a centering code by keyboard decode 5 produces a positive level on line 62A enabling one of the inputs of AND circuit 35. As the codes in memory 10 continue to circulate, a positive level is produced on output line 132 of memory decode 12 when the operation flag code is shifted into buffer A. This enables the other input of AND circuit 35, thereby producing a positive level on line 36 which, in turn, sets the CENT. flip-flop 37 at the bit time following the shifting of the operation flag into buffer A. At this next bit time the operation flag is shifted into register N along the path D and line 41 becomes positive during the delay introduced by DELAY circuit 40.

The positive level on line 41 enables AND circuit 50 to gate a center flag code from center flag code generator 53 onto data buss 15. The positive level on line 41 is gated through OR circuit 144 to clear buffer 3 and is also gated through OR circuit 44 to set INS1 flip-flop 33. The positive level on line 41 is also gated through OR circuit 45 to provide a positive level on line E. Thus, a center flag code is provided on data bus 15 and the E path from data buss 15 to buffer B of memory 10 is enabled such that, at the end of the delay time provided by DELAY circuit 40, a data shift occurs in memory 10 and the center flag code on data buss 15 is shifted into buffer B. At this time, the operation flag code is shifted from register N into register $I_1$, the center flag code is shifted from data buss 15 into buffer B, and flip-flop 33 becomes set because of the positive level applied to the set input thereof during the preceding bit time. The positive output of flip-flop 33 is conveyed along line 76 to provide a positive level to line B. At the next bit time after this, the center flag code is shifted from buffer B into the first memory location of memory 10, and, because line B was positive at this shift, the operation flag code is shifted along the B C E path from register $I_1$ into buffer B. At the next succeeding bit time, the center flag code is shifted into the second memory location of memory 10 and the operation flag code is shifted from buffer B into the first memory location of memory 10. Thus, the organization of the codes in memory 10 is as shown in FIGS. 10 and 11, assuming that one of more escapement control codes such as a series of space codes or a tab code, respectively, were input preceding entry into the centering mode to position the carrier at the desired point for centering.

After a delay of two bit times from the time that a dummy code is decoded by memory decode 12, flip-flop 33 becomes reset by virtue of a positive level on line 32, which, in turn, results in a negative level on line B.

Figure 10:
Figure 11:

As shown in FIG. 10 and 11, and by virtue of the operation described above in organizing the memory codes to assume the sequence of spaces or tab code, center flag code, and operation flag code, the system is now ready to accept, organize, and store textural character codes input from the keyboard 1. The first depression of a character key on keyboard 1 is decoded by decode 5, resulting in a positive level on line 62B which is applied to AND circuit 54 and also to AND circuit 48. Line 51 of AND circuit 54 is positive by virtue of flip-flop 37 having been set by the operation described above, and the line 53 input to AND circuit 54 is positive because it is connected to the Q output of BACKSPACE flip-flop 39 which has not yet been set. When the operation flag code is shifted into buffer A and decoded by decode 12, a positive level appears on line 132 thereby enabling the remaining input of AND circuit 54 to produce a positive level output.

The center flag code, which precedes the operation flag code, is in register N during the time that the operation flag code is in buffer A. The center flag code was previously shifted from buffer A into register N along the D path because of the negative logical level appearing on line D.

At the next bit time the center flag code is shifted from register N along the B C D E path into buffer B because negative logical levels are present on lines B, C, D, and E, and the operation flag code is shifted from buffer A into register N along the D path. The output of DELAY circuit 55 is positive during this bit time thereby providing a positive level on line 70.

The positive level on line 70 is gated through OR circuit 7, along line 8, to enable AND circuit 9 to gate the character code in keyboard buffer 3 onto data buss 15. The positive level on line 70 is also gated through OR circuit 45 so that a positive level is now applied on line E to enable the character code to be shifted into buffer B at the following bit time. The positive level on line 70 is gated through OR circuit 44 to set INS1 flip-flop 33 and is also applied to the S input of BACKSPACE flip-flop 39. The positive level on line 70 is also gated through OR circuit 144 to clear keyboard buffer 3 at the next bit time. During this bit time the operation flag code is located in register N.

At the next bit time, the center flag code is shifted from buffer B into the first memory location of memory 10, and the operation flag code is shifted from register N into register $I_1$ along cable 18. The operation flag code was inhibited from traveling along the B C D E path because line E was positive by virtue of the positive level on line 70 being gated through OR circuit 45.

At this bit time, the character code, gated to the data buss 15 at the previous bit time, is shifted into buffer B. The organization of memory codes is now as follows: center flag code in the first memory location of memory 10, character code in buffer B, operation flag code in register $I_1$, and dummy codes in buffer A and in register N.

At the next succeeding bit time, the center flag code is shifted into the second memory location of memory 10, the character code is shifted from output buffer B into the first memory location of memory 10, and the operation flag code is shifted along the B C E path from register $I_1$ into output buffer B, because of the positive level on line B provided by the Q output of flip-flop 33.

Figure 12:
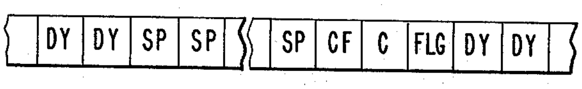

On the next shift the center flag code is moved into the third memory location of memory 10, the character code is shifted into the second memory location of memory 10 and the operation flag code is shifted from buffer B into the first memory location of memory 10. Memory organization is now as shown in FIG. 12, assuming that the character input at the keyboard 1 was a C. The INS1 flip-flop 33 becomes reset at the end of two bit times after the decoding of a dummy code in buffer A, by virtue of a positive level on line 32.

When the first character code was generated, BACKSPACE flip-flop 39 was in a reset condition, thereby providing a positive level at the Q output thereof to enable one of the inputs of AND circuit 54. The Q output of flip-flop 39 was at a negative level, thereby providing a negative level on line 52 to inhibit one of the inputs of AND circuit 48. Upon entry of the first character into buffer B, however, BACKSPACE flip-flop 39 became set, thereby providing a positive level on the line 52 input AND circuit 48 and a negative level on the line 53 input to AND circuit 54. Upon the second depression of a character key on keyboard 1, a decode signal is generated by decode 5, resulting in a positive level on line 62B which is applied to AND circuit 48. Lines 51 and 52 of AND circuit 48 are positive by virtue of flip-flops 37 and 39, respectively, having been set by the operation described above. When the center flag code is shifted into buffer A and decoded by decode 12, a positive level appears on line 133, thereby enabling the remaining input of AND circuit 48 to produce a positive level output.

At the next bit time the center flag code is shifted from buffer A into register N and the first keyboarded text code (the insertion of which was described above) is shifted from the last location of memory 10 into buffer A. A positive output is generated by DELAY circuit 49 to enable a positive output from DELAY circuit 56 at the next succeeding bit time.

At this next succeeding bit time the center flag code is shifted out of register N into buffer B along the B C D E path, the first keyboarded text code is shifted out of buffer A and into register N along the D path, and the operation flag code is shifted from the last memory location of memory 10 into buffer A. The positive output from DELAY circuit 56 on line 78 enables AND circuit 71 to gate a backspace code from backspace code generator 72 onto data buss 15. The positive level on line 78 is also gated through OR circuit 45 so that a positive level is now applied on line E to enable the backspace code to be shifted into buffer B at the following bit time. The positive level on line 78 is also gated through OR circuit 73 to enable AND circuit 74 to gate the backspace code on data buss 15 to printer 75, thereby causing the printer 75 to backspace one space. Finally, the positive level on line 78 is also gated through OR circuit 44 to set INS1 flip-flop 33 at the following bit time.

In the discussion immediately above, when the operation flag code was shifted from the last storage location of memory 10 into buffer A, memory decode 12 produced a positive level on line 132 to indicate the presence of the operation flag code in buffer A. The positive level on line 132 enables DELAY circuit 58 to produce a positive output at the following bit time. At this following bit time, the center flag code is shifted from buffer B into the first memory location of memory 10, and the first keyboarded text code is shifted from register N into register $I_1$ along cable 18. The first keyboarded text code was inhibited from traveling along the B C D E path because line E was positive by virtue of the positive level on line 78 being gated through OR circuit 45. At this bit time, the backspace code, gated to the data buss 15 at the previous bit time, is shifted into buffer B along the E path. The organization of memory codes is now as follows: center flag code in the first memory location of memory 10, backspace code in buffer B, first keyboarded text code in register $I_1$, and operation flag code in register N.

At the next bit time, the center flag is shifted from the first to the second location of memory 10 and the backspace code is shifted from buffer B into the first memory location of memory 10. Because line B is positive (INS1 flip-flop 33 is set) the B C E path is available so that the first keyboarded text code is shifted from register $I_1$ into buffer B. Since line B is positive the B C D E path is not available and the operation flag code is shifted from register N into register $I_1$. At this bit time, DELAY circuit 59 provides a positive output enabling one of the inputs of AND circuit 57. The other input of AND circuit 57 is enabled by the positive level at the Q output of flip-flop 33. Therefore, a positive level is now present at the output of AND circuit 57 on line 65. The positive level on line 65 is gated through OR circuit 7 to enable AND circuit 9 to gate the second keyboarded text code from buffer 3 onto data buss 15. The positive level on line 65 is also applied to the set input of the INS2 flip-flop 34. The positive level on line 65 is gated through OR circuit 45 to provide a positive level on line E and is gated through OR circuit 144 to clear keyboard buffer 3 at the next bit time, and further, is gated through OR circuit 38 to provide a RESET input to flip-flop 39.

At the next bit time the center flag code is shifted into the third memory location of memory 10, the backspace code is shifted into the second memory location of memory 10, the first keyboarded text code is shifted from output buffer B into the first memory location of memory 10, and the second keyboarded text code is shifted from the data buss 15 into output buffer B. Because line E was positive, the B C E path was not available for shifting the operation flag code from register $I_1$ into buffer B. Instead the operation flag code is shifted from register $I_1$, along cable 20, and into register $I_1$.

Figure 13:
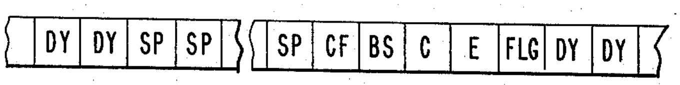

On the next shift the operation flag code is moved from register $I_2$ into buffer B by virtue of the positive level on line C produced by the set condition of flip-flop 34 through line 82. On the shift following this, the operation flag code is shifted from buffer B into the first memory location of memory 10. Memory organization is then as shown in FIG. 13, assuming that the first and second text codes input at the keyboard 1 were C and E respectively. The INS1 and INS2 flip-flops 33 and 34, respectively, become reset at the end of two bit times after the decoding of a dummy code in buffer A, by virtue of a positive level on line 32.

Figure 14:
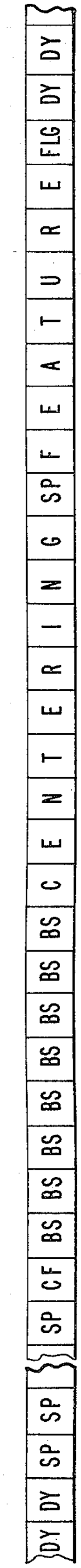

Subsequently keyboarded odd numbered codes (i.e., the third, fifth, seventh, etc., character of space code keyboarded) are entered into the memory 10 immediately preceding the operation flag code, as described above regarding the first keyboard entry from keyboard 1. No codes are sent to the printer 75 and no backspace codes corresponding to the characters are entered into the memory 10. Subsequently keyboarded even numbered codes (i.e., the fourth, sixth, eighth, etc., character of space code keyboarded) are entered into the memory 10 immediately preceding the operation flag code, as described above regarding the second keyboard entry from keyboard 1. For each even numbered entry a backspace code is entered into the memory 10 immediately succeeding the center flag code and the backspace code is also sent to the printer 75 for execution by the printer 75. Thus, BACKSPACE flip-flop 39 is toggled in response to the keying of character codes. Assuming that the words "CENTERING FEATURE" have been entered from the keyboard 1 in the centering mode, organization of codes in the shift register memory 10 is as indicated in FIG. 14.

If a non-escaping code is struck at the keyboard 1, such as a control code to provide a one-half index of the printer platen for a subscript, a positive level is produced by decode 5 on line 62C. The positive signal on line 62C enables one of the three inputs of AND circuit 60. The positive level on line 51 provided by the output of CENT. flip-flop 37 enables the second input of AND circuit 60. When the operation flag code is shifted into buffer A and decoded, a positive level on line 132 provided by decode 12 enables the third input of AND circuit 60, thereby providing a positive input to DELAY circuit 61. At the next bit time the output of DELAY circuit 61 becomes positive and memory organization is generally as follows: a center flag code, $\frac{1}{2}x$ backspace codes, $x$ character codes (the last of said character codes being in buffer B), and the operation flag code in register N.

The positive level at the output of DELAY circuit 61 on line 87 is gated through OR circuit 7 to enable AND circuit 9 to gate the non-escaping character code onto data buss 15. The positive level on line 87 is also gated through OR circuit 144 to clear keyboard buffer 3 at the next bit time. The positive level on line 87 is also gated through OR circuit 44 to set the INS1 flip-flop 33 at the next bit time. The positive level on line 87 is also gated through OR circuit 45 to provide a positive level to line E. This will allow the non-escaping control code presently on the data buss 15 to be gated into buffer B at the next bit time. Because of the positive level on line E immediately before this bit next time, the operation flag code cannot be conveyed from register N to buffer B along the B C D E path. Instead, the operation flag code is conveyed along cable 18 from register N to register $I_1$. At the bit time following this, the non-escaping code is shifted from buffer B into the first memory location of memory 10, and because flip-flop 33 is now set and producing a positive level on line 76 and line B, the operation flag code is shifted along the B C E path from register $I_1$ into buffer B. At the next succeeding bit time, all of the codes preceding the operation flag code are shifted in memory 10 and the operation flag code is shifted from buffer B to the first memory location thereof. It should be noted that the condition of BACKSPACE flip-flop 39 was not affected by the entry of the non-escaping code, nor is a backspace code entered, nor is the odd-even relationship of entering backspace codes affected.

Assume now that after at least two characters have been entered from the keyboard 1 in this mode, the operator realizes an error in one or more of the characters as the text is being entered. The operator may depress an error-correct key which sends a particular code to keyboard buffer 3. Upon the decoding of the error-correct code a positive level appears on line 62D to enable one of the three inputs of AND circuit 94. The positive level output from flip-flop 37 enables a second input of AND circuit 94. When the center flag code is shifted into buffer A, decode 12 produces an output along line 133 enabling the third input of AND circuit 94, thereby providing a positive level on line 95.

The positive level on line 95 is applied to the SET input of ABORT flip-flop 141 and is gated through OR circuit 134 to the SET input of CORRECT flip-flop 96. The positive level on line 95 is also gated through OR circuit 38 to reset flip-flop 39 at the next bit time. The Q output of flip-flop 96 becomes positive at the next bit time providing a positive level on line 97 enabling one of the three inputs of AND circuit 98. Because the printer 75 is not being operated during this period, a negative level is present on printer busy line 114 which is inverted by INVERT circuit 123 to provide a positive level on line 115, thereby enabling the second of the three inputs of AND circuit 98. At this next bit time a backspace code is present in buffer A which is decoded by decode 12 to produce a positive level on line 137 enabling the third input of AND circuit 98, thereby providing a positive level on line 99. The positive level on line 99 enables AND circuit 101 to gate a space code generated by space code generator 102 onto data buss 15. The positive level on line 99 is also gated through OR circuit 73 to enable AND circuit 74 to gate the space code on data buss 15 into printer 75, whereby causing the printer 75 to space forward one space. The Q output of ABORT flip-flop 141 becomes positive at the beginning of this same bit time, thereby providing a positive level on line 142. This flip-flop 141 will remain set throughout the error-correct operation. The positive level on line 142 is gated through OR circuit 144 to hold keyboard buffer 3 in a cleared condition throughout the error correct operation. This inhibits any attempted operator entry of codes until the error-correct operation has been completed.

At the following bit time DELAY circuit 103 produces a positive output which is gated through OR circuit 91 to provide a positive level on line 104. The positive level on line 104 provides an input to enable AND circuit 106 to gate a delete code generated by delete code generator 107 onto data buss 15. The positive signal on line 104 is also gated through OR circuit 45 to line E which enables the delete code to be shifted from the data buss 15 into buffer B at the next bit time. In this manner the first backspace code following the center flag code is replaced by a delete code.

At the time that the space code was gated to printer 75, a positive level appeared on printer busy line 114, which was driven positive to indicate the unavailability of printer 75 to accept further codes. The positive level on line 114 was gated through OR circuit 135 to the RESET input of CORRECT flip-flop 96 which produced a negative level on the Q output and line 97 thereof during the time that the delete code was gated onto the data buss 15.

After the delete code is placed into the data stream, the memory 10 contents are recirculated until the center flag is again detected in buffer A to produce a positive level on line 133, thereby enabling one of the three inputs of AND circuit 140. Assuming that the printer-busy line 114 is now negative, the negative level is inverted by INVERT circuit 123 to provide a positive level on line 115, thereby enabling another input of AND circuit 140. Since ABORT flip-flop 141 remains set throughout this operation, the positive level on line 142 enables the third input of AND circuit 140, thereby providing a positive level on line 143 which is then gated through OR circuit 134 to again set CORRECT flip-flop 96 at the next succeeding bit time.

During the time period of memory 10 recirculation to set flip-flop 96 for the second time, it is assumed that printer 75 has had sufficient time to execute the spacing cycle and that the printer busy line 114 is now at a negative level which is inverted by INVERT circuit 123 to produce a positive level on line 115, thereby enabling an input of AND circuit 98. A positive level appears on line 97 to another input of AND circuit 98 because flip-flop 96 is again in a set condition. Therefore, a positive level appears on line 137 at the detection of the next backspace code in buffer A, causing the printer 75 to again space forward one space and causing this backspace code in the memory 10 to be replaced by a delete code. This process of spacing the printer 75 and replacing backspace codes with delete codes, once per memory cycle, is repeated until all of the backspace codes have been replaced by delete codes in memory 10.

On the memory cycle following that during which the last backspace code was replaced by a delete code, AND circuit 140 again produces a positive output on line 143 upon the decoding of the center flag code. This positive output on line 143 is gated through OR circuit 134 to enable CORRECT flip-flop 96 to become set at the next bit time. The resultant positive levels on line 97 (Q output of flip-flop 96) and line 142 (Q output of flip-flop 141) enable two of the four inputs of AND circuit 110. Decode 12 provides a positive level on line 138 in the absence of a backspace code in buffer A thereby enabling the third input of AND circuit 110. In the absence of the operation flag code in buffer A, a positive level is provided by decode 12 on line 139 which enables the fourth input of AND circuit 110, thereby providing a positive output level to DELAY circuit 111. The output of DELAY circuit 111 produces a positive level at the next bit time that is gated through OR circuit 91 to provide a positive level on line 104. The positive level on line 104 provides an input to enable AND circuit 106 to gate a delete code generated by delete code generator 107 onto data buss 15. The positive level on line 14 is also gated through OR circuit 45 to provide a positive level on line E thereby enabling a character code to be replaced by a delete code at the next succeeding bit time.

At the beginning of the bit time during which DELAY circuit 111 produces a positive output, another code is shifted into buffer A. The output of AND circuit 110 becomes positive again if this code is neither a backspace code nor the operation flag code and another character code is thereby deleted during the same memory cycle. It will, therefore, be understood, that, although backspace codes could be replaced by delete codes only once per cycle because of the necessity to space the relatively slow moving printer 75 for each backspace code deleted, any number of character codes may be replaced by delete codes in the same memory cycle since no printer operation is required.

As the character codes are shifted through buffer A and subsequently replaced by delete codes, the operation flag code is eventually shifted into buffer A causing a positive signal on line 132 enabling one of the inputs of AND circuits 121. Another of the three inputs of AND circuit 112 is enabled by a positive level on line 142 generated by ABORT flip-flop 141. The third input of AND circuit 112 is enabled by the positive output level from flip-flop 96 appearing on line 97. Thus, all of the inputs of AND circuit 112 are now enabled resulting in a positive output on line 113 which is gated through OR circuit 135 to reset CORRECT flip-flop 96 at the next bit time. The positive level on line 113 is also connected to reset ABORT flip-flop 141 at the next bit time. At this time the memory organization is as follows: center flag code, a plurality of delete codes, operation flag code, and dummy codes.

A discussion of the removal of delete codes from the memory 10 is discussed in the above-referenced U.S. Pat. No. 3,675,216. Therefore, no detailed discussion of this operation is included herein. However, it will be understood by those skilled in the art that the removal of a single delete code per memory revolution can be accomplished by applying a positive level to line D at one bit time following the decoding of a delete code in buffer A and sustaining this positive level on line D until the decoding of the first dummy code to be shifted into buffer A. At the time that this dummy code is shifted into buffer A, positive levels are applied to lines A and E for one bit time and a negative level is sustained on line D until the next delete code is detected on the next memory revolution. The repetition of this process, once per memory revolution, results in the eventual removal of all delete codes.

It is not necessary that the delete codes be removed from the memory 10 before input of subsequent characters. At the termination of the above-described error-correct operation the system remains in the centering mode. If characters are keyboarded before removal of the delete codes may be entered into the memory 10 as if there were no delete codes therein. Thus, backspace codes are always input immediately succeeding the center flag code and textural codes are always input immediately preceding the operation flag code. The delete codes may be removed during subsequent memory revolutions during which no other operations are being performed. If any delete codes remain in the memory 10 at the time of output to the printer 75, the decode of the printer 75 may be structured to be unresponsive to the delete codes.

Assume now that the operator has completed the keyboard entry of the text to be centered and desires that the text be printed. At this time the operator depresses any of a number of control keys, such as a tab key or a carrier return key, to produce a code defined hereinafter as a field-end code. Upon the decoding of a field-end code by keyboard decode 5, a positive level appears on line 62F, enabling one of the three inputs of AND circuit 116. Because of the CENT. flip-flop 37 has never been reset during this mode of operation, a positive level appears on line 51 enabling another input of AND circuit 116. Decode 12 produces a positive level on line 133 when the center flag code is shifted into buffer A, thereby enabling the third input of AND circuit 116, which provides a positive level on output line 117 thereof. The positive level on line 117 is applied to the SET input of PRINT flip-flop 118 which produces a positive level at the Q output thereof on line 119 at the next bit time. Flip-flop 118 remains set throughout the printing operation and the positive level on line 119 is transmitted to the INHIBIT input of keyboard decode 5 to inhibit decode 5 from outputting any further decode 5 outputs during this operation. The positive level on line 119 is also transmitted to the INHIBIT input of keyboard 1 to inhibit the generation of further keyboardgenerated codes during this operation.

The positive level on line 119 enables one of the three inputs of AND circuit 108. Because the printer 75 is not busy at this time, the positive level appears on line 115 and enables another input of AND circuit 108. When the center flag code is shifted into buffer A on the next memory revolution, decode 12 produces a positive level on line 133 enabling the third input of AND circuit 108 to produce a positive output to the set input of CONTROL LINE D flip-flop 129.

One bit time later, when the center flag code is shifted from buffer A into register N, flip-flop 129 becomes set producing a positive level at the Q output thereof on line 130. The positive level on line 130 enables one of the two inputs of AND circuit 120. When the center flag code was shifted from buffer A into register N, the backspace code following the center flag code was shifted from the last memory storage location of memory 10 into buffer A. The decoding of this backspace code in buffer A produces a positive level on line 137 enabling AND circuit 120 to produce a positive level at the output thereof on line 121.

This positive level on line 121 is gated through Or circuit 122 to provide a positive level on line D. Memory organization at this point is as follows: center flag code in register N, and the first of a series of backspace codes in buffer A. At the next bit time, because a positive level was present on line D, the center flag code cannot be conveyed along the B C D E path to buffer B. Instead, the center flag code is shifted along cable 18 into register $I_1$, while also remaining in register N, since no code is shifted into register N to write over the center flag code. The backspace code is shifted from buffer A along the D E path into buffers B. Line D is sequentially driven positive in a like manner for each of the succeeding backspace codes that are shifted into buffer A. After the last backspace code has been shifted out of buffer A along the D E path and into buffer B, the next code to be shifted into buffer A will be a character code. At this time, decode 12 provides a positive level on line 138 to one of the three inputs of AND circuit 125, since the character code is not a backspace code. Decode 12 provides a positive level on line 139 to a second input of AND circuit 125, since the character code in buffer A is not the operation flag code. The positive level on line 130 is applied to the third input of AND circuit 125 which enables the production of a positive level at the output thereof on line 126.

The positive level on line 126 is applied to line A and is gated through OR circuit 122 to be applied to line D. The application of a positive level to line A causes the character in buffer A to be gated onto data buss 15 during the same bit time. The positive level on line 126 is also gated through OR circuit 73 to enable AND circuit 74 to gate the character on data buss 15 into printer 75 for printing. At the next bit time the character code in buffer A will be shifted along the D E path into buffer B because of the positive level applied to line D during the preceding bit time.

Figure 15:
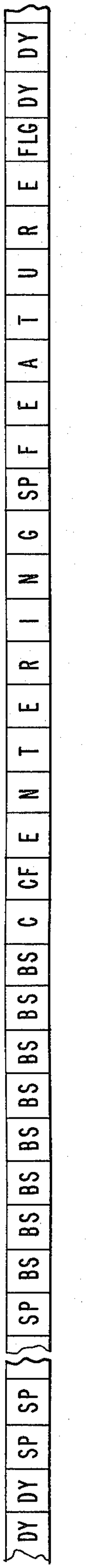

At the same time that the character code is gated from data buss 15 into printer 75, a positive level appears on printer busy line 114 which is gated through OR circuit 109 to reset flip-flop 129 at the next bit time thereafter. The resetting of flip-flop 129 results in a negative level on line 130 which inhibits AND circuit 125 from allowing further character codes to be gated onto the data buss 15 and to the printer 75 during this memory revolution. However, line D became negative at the beginning of the bit time in which the character code in buffer A was shifted along the D E path into buffer B. At that time the B C D E path became available for the center flag code stored in register N to be shifted into buffer B at the following bit time. The memory organization following this shift is shown in FIG. 15. It will, thus, be understood by those skilled in the art that the center flag code is used as a print position flag during this initial printout operation.

On the next memory revolution decode 12 provides a positive level on line 133 to one of the inputs of AND circuit 108 when the center flag code is shifted into buffer A. Line 119 into AND circuit 108 remains positive because of the sustained, set condition of flip-flop 118. Assuming that printer busy line 114 is now negative, a positive level on line 115 enables the third input of AND circuit 108 to provide a positive level to the SET input of flip-flop 129. At the next bit time thereafter, a positive level is present on line 130 providing a positive level to one of the three inputs of AND circuit 125. AND circuit 125 provides a positive level output on line 126 provided that the code now present in buffer A is neither a backspace code nor the operation flag code. The positive level on line 126 enables the printing of the character presently stored in buffer A in the same manner as described above. As soon as the character is sent to the printer 75, printer busy line 114 becomes positive which resets flip-flop 129 one bit time thereafter. At this next bit time the character in buffer A is shifted along the D E path into buffer B. At the next succeeding bit time the B C D E path is available to the succeeding codes, and the center flag code is again inserted into the data stream immediately following the character just printed.

Figure 16:
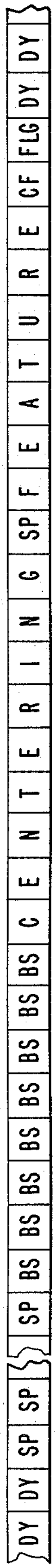

Assume now that the last character has been printed and that the center flag code has been dropped back into the data stream immediately following the last character. The center flag code is, therefore, positioned between the last character and the operation flag code by virtue of the printing operation of the system described above. Such a memory organization is depicted by FIG. 16 with the assumption that the text stored in memory 10 is "CENTERING FEATURE."

When the center flag code is shifted into buffer A on the next memory revolution, decode 12 produces a positive level on line 133, thereby enabling one of the inputs of AND circuit 108. Assuming that the printer 75 is not busy a positive level is present on line 115 to enable another input of AND circuit 108. Because flip-flop 118 has remained set during this period a positive level is also present on line 119 enabling AND circuit 108 to produce a positive level at the output thereof to set flip-flop 129 at the next bit time. At this next bit time the center flag code is shifted from buffer A into register N and the operation flag code is shifted from the last storage location of memory 10 into buffer A.

Decode 12, therefore, provides a positive level on line 132 to enable one of the inputs of AND circuit 127. A positive level is also provided on line 130 by virtue of the set condition of flip-flop 129, thereby enabling another of the three inputs of AND circuit 127. Assuming that the printer 75 is not busy, a positive level on line 115 enables the third input of AND circuit 127 thereby providing a positive output on line 128. The positive level on line 128 is gated through OR circuit 7 to enable AND circuit 9 to gate the field-end code from keyboard buffer 3 onto data buss 15. The positive level on line 128 is also gated through OR circuit 45 to provide a positive level on line E. The positive level on line E will enable the field-end code to be shifted from the data buss 15 into buffer B at the next bit time. The positive level on line 128 is also gated through OR circuit 73 to enable AND circuit 74 to gate the field-end code from data buss 15 to printer 75 for execution by printer 75. The positive level on line 128 also resets CENT. flip-flop 37 and PRINT flip-flop 118 at the next bit time.

Figure 17:
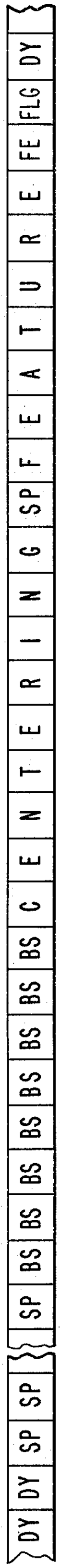

When the next bit time occurs, the last character of the character group stored in memory 10 is shifted out of buffer B into the first storage location of memory 10. The field-end code on data buss 15 is shifted into buffer B and the center flag code is shifted from register N along cable 18 into register $I_1$ because of the positive level on line E when the shift occurred. The operation flag code is shifted from buffer A into register N. At the next shift time the logical level on line E will be negative so that the operation flag code in register N will be conveyed along the B C D E path into buffer B and the field-end code in buffer B will be shifted into the first memory location of memory 10. FIG. 17 depicts the relevant portion of the data stream circulating through memory 10 after the replacement of the center flag code with the field-end code.

For subsequent print-out of this data code stream the operation flag code may be moved to a position preceding the first backspace code and may then be shifted around each control code for printer control and around each character code for character print-out. After the first printing, therefore, the operation flag code position defines the operating point for output of control and character codes to the printer 75 just as the center flag code was used above to define the operating point of character codes output to the printer 75 after the printer 75 had previously been backspaced during the entry of the character codes into the memory 10. It will then be appreciated by those skilled in the art that the data and control codes stored in memory 10 (excluding the operation flag code) may be recorded out of memory 10 onto a bulk media such as a magnetic tape or a magnetic card and may then be printed by another type of text editing system not including the above disclosed centering mode of operation.

Operation of the invention in a centering mode would typically involve tabbing or spacing to the desired center location, it being understood that the tab or space codes would be stored in the memory 10. Thereafter, upon depression of the centering key on the keyboard 1, the system enters the centering mode of operation. The operator may then enter the text to be centered from the keyboard 1. As the text is entered, each code is entered into the memory 10 while the printer 75 performs a no-print backspace cycle for each even numbered entry, disregarding non-escaping codes. When a field-end code (such as a carrier return) is struck at the keyboard the characters are printed and the field-end operation is executed (such as the carrier return). At this point the system is no longer in the centering mode of operation.

If an error is discovered by the operator during entry of text, a depression of the error-correct key will cause a deletion of the previously entered text and will cause the carrier to be repositioned to the initially chosen center position. The system remains in the centering mode of operation and the operator need only enter the correct text.

While the invention has been particularly shown and described with reference to a preferred embodiment thereof, it will be understood by those skilled in the art that the foregoing and other changes in form and details may be made therein without departing from the spirit and scope of the invention. For example, it will be understood by those skilled in the art that input means other than a keyboard may be utilized for initial code generation including, for example, a transmission line in a communications system. It will also be understood that memory devices other than dynamic shift register memories, such as a magnetic bubble memory, may be utilized for the data code storage device. It will further be understood that, although in the preferred embodiment the backspace codes were entered upon receipt of even numbered escaping text codes entries, the backspace codes could, instead, be entered upon receipt of odd numbered escaping text code entries, by simple logical changes including reversal of lines 52 and 53.

What is claimed is:

1. A system for arranging and storing a sequence of textural codes upon input of said codes into a recirculating memory having an operation flag code defining an operating point therein, said codes being arranged and stored in said memory to facilitate centering of said codes about a chosen point when said codes are output to a printer, said system comprising:

first means for generating textural character codes and one or more escapement control codes capable of causing printer escapement to said chosen point;

second means for generating backspace codes;

escapement control code input means for inputting said one or more escapement control codes into said memory preceding said operation flag code;

textual character input means for inputting each textual character code generated by said first means into said memory immediately preceding said operation flag code; and backspace input means for inputting a backspace code into said memory in response to the generation of every other escaping textual code, said backspace codes being input into said memory preceding the first entered textual character code and succeeding said one or more escapement control codes;

said character input means and said backspace input means cooperating with said first and second generating means and said memory for causing the storage in said memory of a contiguous stream of textural character codes, preceded by a contiguous stream of backspace codes, preceded by one or more escapement control codes.

2. The system of claim 1 wherein said first means further comprises means for generating a centering control code and said system further includes means responsive to the generation of said centering control code, before said generation of any of said textual codes, for inputting a centering flag code into said memory immediately preceding said operation flag code.

3. The system of claim 2 wherein said backspace input means further comprises means for inputting each of said backspace codes into said memory immediately succeeding said centering flag code.

4. The system of claim 2 further comprising a printing means and means, upon the input of said backspace codes into said memory, for transmitting said backspace codes to said printing means, whereby said printing means backspaces once for each of said transmitted backspace codes.

5. The system of claim 4 wherein said first means further comprises means for generating an error-correct control code and said second means includes means for generating delete codes and said systems further includes means, upon the generation of an error-correct control code, for replacing said textural character codes and said backspace codes in said memory with delete codes.

6. The system of claim 5 further comprising means, upon the generation of said error-correct control code, for spacing said printing means forward one space for each of the backspace codes replaced with delete codes in said memory.

7. The system of claim 6 further comprising means, upon the replacement of said textural character codes and backspace codes with delete codes, for removing said delete codes from said memory.

8. The system of claim 4 wherein said first means further comprises means for generating a field-end code and said system further includes means, upon the generation of a field-end code, for transmitting said textual character codes in said memory to said printing means in the order of the input of said textual character codes into said memory.

9. The system of claim 8 further comprising means for removing said centering flag code from said memory.

10. The system of claim 9 wherein said memory comprises a dynamic shift register.

11. The system of claim 10 wherein each of said textual codes, control codes, and flag codes recirculated in said dynamic shift register comprise combinations of n binary digits.

12. The system of claim 11 wherein said first means further comprises an electrical keyboard.

13. A method for arranging and storing a sequence of textural codes upon input of said codes into a recirculating memory having an operation flag code defining an operating point therein, said codes being arranged and stored in said memory to facilitate centering of said codes about a chosen point when said codes are output to a printer, said method comprising:

a. generating one or more escapement control codes capable of causing printer escapement to said chosen point;
b. inputting said one or more escapement control codes into said memory preceding said operation flag code;
c. generating a centering control code;
d. inputting, in response to the generation of said centering control code, a centering flag code into said memory immediately preceding said operation flag code;
e. generating textual character codes;
f. generating backspace codes;
g. inputting said textual character codes into said memory immediately preceding said operation flag code; and
h. inputting one of said backspace codes into said memory in response to the generation of every other escaping textual code, each of said backspace codes being input into said memory immediately succeeding said centering flag code, thereby storing in said memory said one or more escapement control codes, succeeded by said centering flag code, succeeded by a contiguous stream of backspace codes, succeeded by a contiguous stream of textual character codes, succeeded by said operation flag code.

14. The method of claim 13 further comprising:

g. generating an error-correct code; and
h. deleting said textual character codes and said backspace codes from said memory upon the generation of said error-correct code.

* * * * *

UNITED STATES PATENT OFFICE
CERTIFICATE OF CORRECTION

PATENT NO. : 3,924,723

DATED : 12-9-75

INVENTOR(S) : Donald Walter Cooper & James Bradley Unruh

It is certified that error appears in the above-identified patent and that said Letters Patent are hereby corrected as shown below:

Claim 1

On column 18, line 34 delete "textural" and insert --textual--.

On column 18, line 40 delete "textural" and insert --textual--.

On column 18, line 62 delete "textural" and insert --textual--.

Claim 5

On column 19, line 20 delete "textural" and insert --textual--.

Claim 7

On Column 19, line 29 delete "textural" and insert --textual--.

Claim 13

On Column 20, line 6 delete "textural" and insert --textual--.

Signed and Sealed this

*twentieth* Day of *April 1976*

[SEAL]

*Attest:*

RUTH C. MASON
*Attesting Officer*

C. MARSHALL DANN
*Commissioner of Patents and Trademarks*